United States Patent [19]

Park

[11] Patent Number: 5,730,192

[45] Date of Patent: Mar. 24, 1998

[54] APPARATUS FOR FILLING A BATTERY WITH ELECTROLYTE

[75] Inventor: Woo-Jin Park, Seoul, Rep. of Korea

[73] Assignee: Daewoo Electronics Co.,Ltd., Seoul, Rep. of Korea

[21] Appl. No.: 686,588

[22] Filed: Jul. 26, 1996

[30] Foreign Application Priority Data

Jul. 28, 1995 [KR] Rep. of Korea .................. 95-22748

[51] Int. Cl.$^6$ ................................................ H01M 2/36
[52] U.S. Cl. ................................................ 141/34; 141/32
[58] Field of Search .................. 141/1.1, 32, 34; 29/2, 623.1, 623.5

[56] References Cited

U.S. PATENT DOCUMENTS

| | | | |
|---|---|---|---|
| 4,980,249 | 12/1990 | Isoi et al. | 429/122 |
| 5,487,417 | 1/1996 | Kasahara et al. | 141/32 |

FOREIGN PATENT DOCUMENTS

| | | |
|---|---|---|
| 44 31 357 | 3/1995 | Germany . |
| 59-124558 | 8/1984 | Japan . |
| 62-139247 | 6/1987 | Japan . |
| 7-3351596 | 12/1995 | Japan . |
| 8-7879 | 1/1996 | Japan . |

*Primary Examiner*—J. Casimer Jacyna

[57] ABSTRACT

An apparatus for filling a battery with electrolyte has an electrolyte feeding unit pivotally mounted on a body, an electrolyte filling port slidably installed within each of longitudinal holes of the case receiving unit, and a valve unit for opening the filling nozzle of the electrolyte filling port. A bias member is installed between the shoulder of the filling port and the upper end of the case receiving unit. A filling valve is located at the upper edge of the filling nozzle. When the rotation speed of the body reaches a predetermined speed, the filling port overcomes the biasing force of the bias member and slides down towards the case, so that the filling nozzle is opened. When the rotation speed of the body is less than the predetermined speed, the filling nozzle is closed by the valve. Thus, the electrolyte in the filling port does not leak outside.

6 Claims, 9 Drawing Sheets

APPARATUS FOR FILLING A BATTERY WITH ELECTROLYTE

FIELD OF INVENTION

The present invention relates to an apparatus for filling a battery with electrolyte, more particularly to an apparatus for preventing erosion of a battery case when the battery case is filled with the electrolyte.

BACKGROUND OF INVENTION

A lithium battery is generally used as an electric power source for a potable device such as a camcorder or the like, since the battery is easy to carry with and mount on the device. The lithium battery has a lithium metal as a cathode activating material, and a manganese dioxide as an anode activating material. The lithium battery also has an electrolyte, which includes an inorganic electrolyte dissolved in a nonaqueous solution containing propylene carbonate. FIG. 1 is an exploded perspective view showing a conventional lithium battery. FIG. 2 is a cross sectional view showing an assembled state of the battery as shown in FIG. 1. FIG. 3 is an enlarged cross sectional view of portion A shown in FIG. 2. As shown in FIGS. 1 and 2, a lithium battery 100 has a case 60. A bending potion 61 is formed at an upper portion of case 60, and case 60 below bending portion 61 is filled with an electrolyte 70. Current is generated by the reaction of electrolyte 70, and is thereby applied to a load through a positive electrode lead 51 and a negative electrode lead 52. With reference to FIG. 2, negative electrode lead 52 is bent to make contact with the inner bosom surface of case 60. A cover 30 is placed at an upper potion of case 60. Cover 30 has a though hole 31 formed at the central portion thereof.

Positive electrode lead 51 is bent to make contact with cover 30. Aluminum foil 32 and a ring plate 33 comprised of plastic, are stacked in cover 30. In the case of an explosion of electrolyte 70, aluminum foil 32 is easily tom so that the gases generated by the explosion is vented.

As shown in FIGS. 2 and 3, a positive temperature coefficient (PTC) thermistor 20 is positioned on cover 30. The resistance of PTC thermistor 20 approaches infinity when the temperature rises above a predetermined value, e.g., 80 degree Celsius. PTC thermistor 20 has an opening 21 corresponding to through hole 31 of cover 30 at the center portion of PTC thermistor 20. When the temperature of electrolyte 70 rises above the predetermined value, the resistance of PTC thermistor 20 approaches infinity, and the current is cut off. A cap 10, which functions as a positive electrode terminal, is positioned on PTC thermistor 20. A vent hole 11 is formed at the center portion of cap 10. PTC thermistor 20 is manufactured by mixing various metals. When the temperature of the battery rises above 80 degree Celsius, the resistance of PTC thermistor 20 approaches infinity, thereby causing the current to be cut off.

As shown in detail in FIG. 3, a gasket 40 for sealing the interior of case 60 is provided between the inner surface of case 60 and the stacked cap 10, PTC thermistor 20, and cover 30, and surrounds the stacked cap 10, PTC thermistor 20, and cover 30. Case 60 is made of a conductive metal material, and makes contact with negative electrode lead 52 so as to function as a negative electrode terminal. The upper end of case 60 is bent towards the interior of case 60, so gasket 40 is fixed at an upper portion of case 60 above bending portion 61.

Winding assembly 50 in case 60 chemically reacts with electrolyte 70 in case 60, thereby generating current. Winding assembly 50 in case 60 is wound outward and has either a spiral shape or a cylindrical shape. In the lithium battery, it is generally necessary to make the reaction area as large as possible to obtain a relatively high voltage. Winding assembly 50, which is comprised of a metal sheet coated with a material thereon that reacts with electrolyte 70, is wound outward to maximize the reacting area with electrolyte 70, and has either a spiral shape or a cylindrical shape. Winding assembly 50 is manufactured by coating a mixture obtained by mixing manganese dioxide and carbon by means of a binder on an expanded metal, which is either a metal net or a slitted metal sheet. Current is generated by the reaction of winding assembly 50 with electrolyte 70, and is applied to a load via anode and cathode leads 51 and 52.

By using lithium battery 100 as above, current is generated by the reaction of winding assembly 50 with electrolyte 70, and the current generated in this manner is applied to a portable electrical device through positive and negative electrode leads 51 and 52. In lithium battery 100, there is a possibility of explosion of electrolyte 70 due to a high temperature or an external shock. At this time, aluminum foil 33 is torn so that the expanded gases can be exhausted outside case 60 through both through hole 31 of PTC thermistor 20 and vent hole 11 of cap 10.

The electrolyte is filled between positive and negative electrode leads 51 and 52 of winding assembly 50. Since electrolyte 70 erodes quickly, it is preferable to fill case 60 with electrolyte 70 rapidly. However, since the distance or gap between positive and negative electrode leads 51 and 52 is very narrow, the filling speed of electrolyte 70 in a natural state is slow.

There are two methods for filling the electrolyte between positive and negative electrode leads 51 and 52 of case 60. One method utilizes a vacuum, and the other method utilizes a centrifugal force. According to the first method, the method utilizing a vacuum, the inside of case 60 is vacuumized, and then is filled with electrolyte 70. When such a method is used, since the inside of case 60 is in a vacuum state, the negative pressure of the inside of case 60 causes the area between positive and negative electrode leads 51 and 52 of winding assembly 50 to be filled with electrolyte 70.

According to the second method that utilizes the centrifugal force, while the centrifugal force is being applied to the bottom of case 60 wherein winding assembly 50 is installed, case 60 is filled with electrolyte 70. According to this method, electrolyte 70 pushes the air existing between positive and negative electrode leads 51 and 52 of winding assembly 50 to the outside of case 60, and the area between positive and negative lo electrode lead 51 and 52 is filled with electrolyte 70.

The method utilizing a vacuum is disclosed in U.S. Pat. No. 4,980,249 entitled "Electrolyte Feeder for Battery", issued to Toshihiro Isoi et. al. The electrolyte feeder of Toshihiro includes a body having as many shells as the number of cells in a battery. The inside of the shell is filled with the electrolyte to be fed to each cell, and the feeder is turned upside down so as to feed the electrolyte into the shell. As air flows into the shell, the electrolyte in the shell is fed into the cells of the battery.

A conventional apparatus 200 for filling case 60 with electrolyte 70 by using centrifugal force is shown in FIGS. 4 to 6. As shown in the figures, apparatus 200 includes a case receiving section 210, into which case 60 having winding assembly 50 therein is placed, for supporting case 60, and a filling port 220, which is fixed on the upper portion of case receiving section 210, for filling case 60 with a predetermined amount of electrolyte 70.

Case receiving section 210 is pivotally connected to the lower portion of body 230 by a pair of connecting members 234, and pivots to become parallel to body 230 during the rotation of body 230.

Electrolyte feeding portion 240 includes a pump 242 for feeding a predetermined amount of electrolyte 70, feeding nozzles 246, which are located above body 230 for feeding the predetermined amount of electrolyte 70 to filling port 220, and a nozzle support 248 for supporting feeding nozzles 246.

Case receiving section 210 has a plurality of longitudinal holes 212 each formed therein for receiving one of the cases 60. Each of longitudinal holes 212 is divided into two by a pivotable supporting plate 214 supporting case 60. When each case 60, wherein winding assembly 50 is placed, is moved by a conveyor belt (not shown) and reaches a position under case receiving section 210, longitudinal holes 212 are opened by the pivoting of supporting plate 214 and then each case 60 is inserted into each of longitudinal holes 212 and is supported by supporting plate 214.

Each of filling ports 220 is fixed at the upper portion of each of longitudinal holes 212 of case receiving section 210. The upper portion of each of filling ports 220 is opened. At the lower portion of each of filling ports 220, a filling nozzle 222, which is normally in an open state, is provided.

Body 230 is formed of a circular plate and is rotated by a motor or the like. Case receiving section 210 is pivotally hinged by connecting members 234 at the lower portion of body 230 at a predetermined distance away from body 230. Body 230 has many pairs of feeding openings 232 having the same central lines as those of filling ports 220.

The operation of apparatus 200 as above will be described hereinafter.

Case 60 is moved to the lower portion of one of longitudinal holes 212 by the conveyor. At this time, longitudinal holes 212 are opened by the pivoting of supporting plate 214. Case 60 is inserted into one of longitudinal holes 212. Then, case 60 is supported by re-pivoting of supporting plate 214.

Electrolyte 70 is fed into feeding nozzles 246 by pump 242, and then is filled into filling port 220 by feeding nozzles 246. Body 230 rotates at a predetermined angle.

After body 230 is rotated by a predetermined angle, the steps of inserting case 60, feeding electrolyte 70 to filling port 220, and rotating body 230 by a predetermined angle are repeated until all cases 60 are inserted into case receiving section 210, and all filling port 220 are filled with the predetermined amount of electrolyte 70. When the insertion of case 60 into case holding portion 210 and the feeding of electrolyte 70 to filling port 220 are finished, body 230 rotates at a high speed.

The centrifugal force generated by the rotation of body 230 is applied to case receiving section 210 attached to body 230. The centrifugal force pivots case receiving section 210 and raises case receiving section 210 from the ground level as body is 230 simultaneously being rotated. Case receiving section 210 rises to be positioned at the same level as body 230 while being rotated with body 230.

Electrolyte 70, which has been fed into filling port 220, flows into case 60 by centrifugal force as body 230 rotates. The electrolyte poured into case 60 permeates into winding assembly 50. The air existing in winding assembly 50 is vented out of case 60 by electrolyte 70.

When electrolyte 70 in filling port 220 permeates into the whole space of case 60, i.e., into winding assembly 50, the rotation speed of body 230 is lowered so that case receiving section 210 returns to its original position. Case 60 filled with electrolyte 70 is unloaded from case receiving section 210, and undergoes a cleaning process.

However, according to the conventional apparatus 200 as above, filling nozzle 222 of filling port 220 is in the open state when electrolyte 70 is being fed to filling port 220. Thus, after one case 60 has been inserted into case receiving section 210 and one filling port 220 has been filled with electrolyte 70, when another case 60 is inserted into a new case receiving section 210 and electrolyte 70 is fed to a new filling port 220, electrolyte droplet 72 is formed at the leading edge of filling nozzle 222 due to the leakage of electrolyte 70.

When body 230 is in a stationary state, electrolyte droplet 72 formed at the leading edge of filling nozzle 222 gradually grows and falls by gravity down onto case 60. A portion of fallen electrolyte droplet 72 permeates into winding assembly 50, and the rest is scattered and stuck on outer wall of case 60. Moreover, electrolyte droplet 72 of the leading edge of filling nozzle 222 falls down and sticks to the outside of case 60 while the rotation speed of body 230 increases to the predetermined speed. Thus, the outer wall of case 60 is easily corroded because of the very strong corrosiveness of electrolyte 70. To solve this problem, it is necessary to manually clean the outer wall of case 60 to which electrolyte 70 is stuck.

If electrolyte droplet 72 of the leading edge of filling nozzle 222 has fallen onto case 60, winding assembly 50 chemically reacts with electrolyte 70 in case 60, thereby generating electric current. Thus, the duration of the battery's life and the amount of electrolyte 70 in the battery can vary according to the point in time when the electrolyte droplet has fallen.

SUMMARY OF THE INVENTION

Therefore, an object of the present invention is to provide an apparatus for filling a battery with electrolyte capable of preventing corrosion of case, of filling cases with a constant amount of electrolyte at the same time, and of producing batteries having uniform electrical properties.

To achieve the object of the present invention, there is provided an apparatus for filling a battery with electrolyte, comprising:

- an electrolyte feeding unit for feeding a predetermined amount of the electrolyte, the electrolyte feeding unit including a feeding nozzle for feeding the electrolyte;
- a case receiving unit for receiving and supporting a case having a winding assembly therein, the case receiving unit including a longitudinal hole into which the case is inserted, and a supporting plate pivotally installed at a lower portion thereof for supporting the case;
- a body, located below the feeding nozzle, for rotating the case receiving unit, a number of pairs of feeding openings being formed at a predetermined distance apart from each other on an outer circumference thereof, and the case receiving unit being pivotally installed at a lower portion of the body;
- an electrolyte filling port, which is slidably installed within the longitudinal hole of the case receiving unit, for storing the electrolyte fed from the feeding nozzle, the electrolyte filling port being lowered in a longitudinal direction of the case receiving unit when the body rotates at a speed not less than a predetermined speed, and being raised in the longitudinal direction of the case receiving unit when the body rotates with a speed less than the predetermined speed, the filling port having a filling nozzle formed at a lower portion of the electrolyte filling port, and a shoulder formed at an upper end of the electrolyte port; and a valve unit for opening the filling nozzle when the body rotates at a speed not less than the predetermined speed, and for closing the filling nozzle when the body rotates at a speed less than the predetermined speed.

The body is comprised of a circular plate. A pair of feeding openings are formed apart from each other at the predetermined distance on the outer circumference of the body.

The valve unit includes a bias member, installed between the shoulder of the filling port and the upper end of the case receiving unit, for exerting a biasing force to the filling port, a filling valve located at the upper edge of the filling nozzle for opening and closing the filling nozzle, and a valve supporting plate, on which the valves hang. The valve supporting plate is fixed to the upper end of the case receiving unit between the filling ports.

When the case is inserted into the case receiving unit and a predetermined amount of electrolyte is fed into filling port, the body starts to rotate. During the rotation of the body, the centrifugal force is exerted to the case receiving unit, and the lower portion of the case receiving unit pivots at the connection member as a center, and is raised. When the rotation speed of the body reaches the predetermined speed, the case receiving unit slides down along the longitudinal direction of the case receiving unit while overcoming the biasing force of the bias member. That is, the filling port slides down towards the case, and the filling nozzle is opened. At this time, the electrolyte in the filling port flows into the case and permeates into the winding assembly.

According to the present invention, the scattering of the electrolyte is prevented because the filling nozzle is not opened until the rotation speed of the body reaches the predetermined speed. Also, many cases are simultaneously filled with the same amount of the electrolyte. Moreover, since the electrolyte does not adhere to the outer wall of the case, the corrosion of the case is prevented. Thus, batteries having uniform electrical properties can be manufactured.

BRIEF DESCRIPTION OF DRAWINGS

The above object and other advantages of the present invention will become more apparent by describing in detail a preferred embodiment thereof with reference to the attached drawings, in which.

DETAILED DESCRIPTION OF PREFERRED EMBODIMENTS

Figure 1:
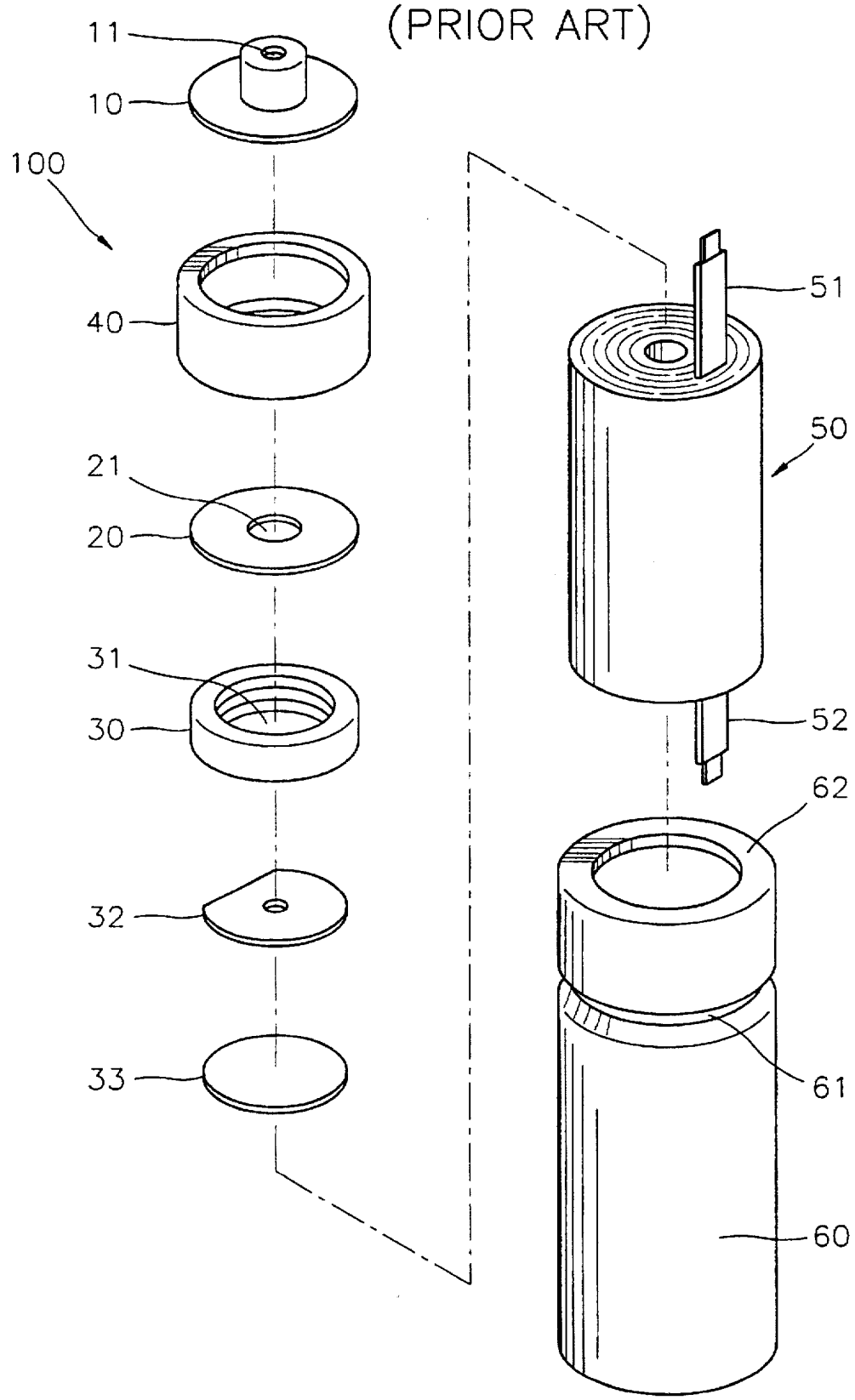
FIG. 1 is an exploded perspective view of a conventional lithium battery.
Figure 2:
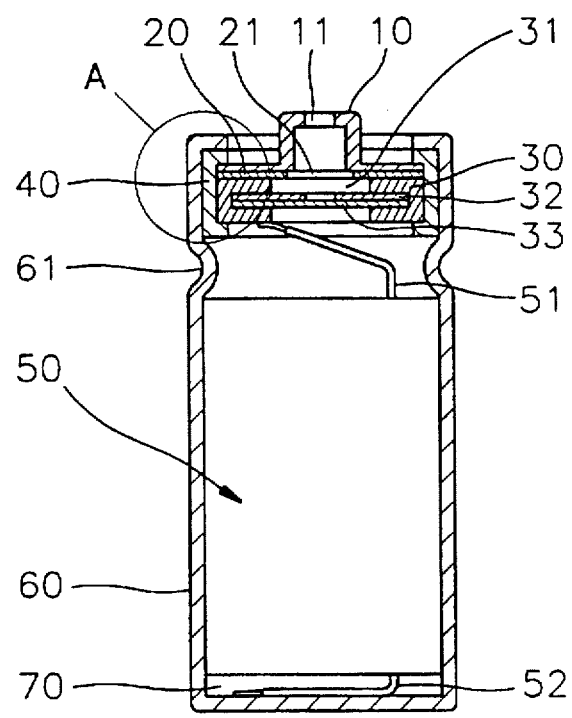
FIG. 2 is a cross sectional view for showing the assembled state of the lithium battery shown in FIG. 1.
Figure 3:
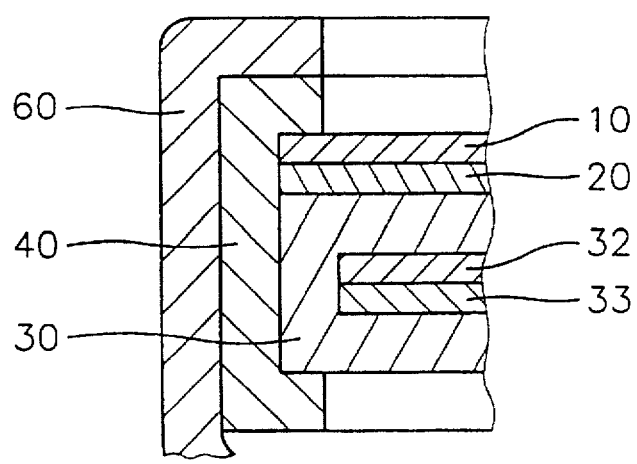
FIG. 3 is an enlarged cross sectional view of portion A in FIG. 2.
Figure 4:
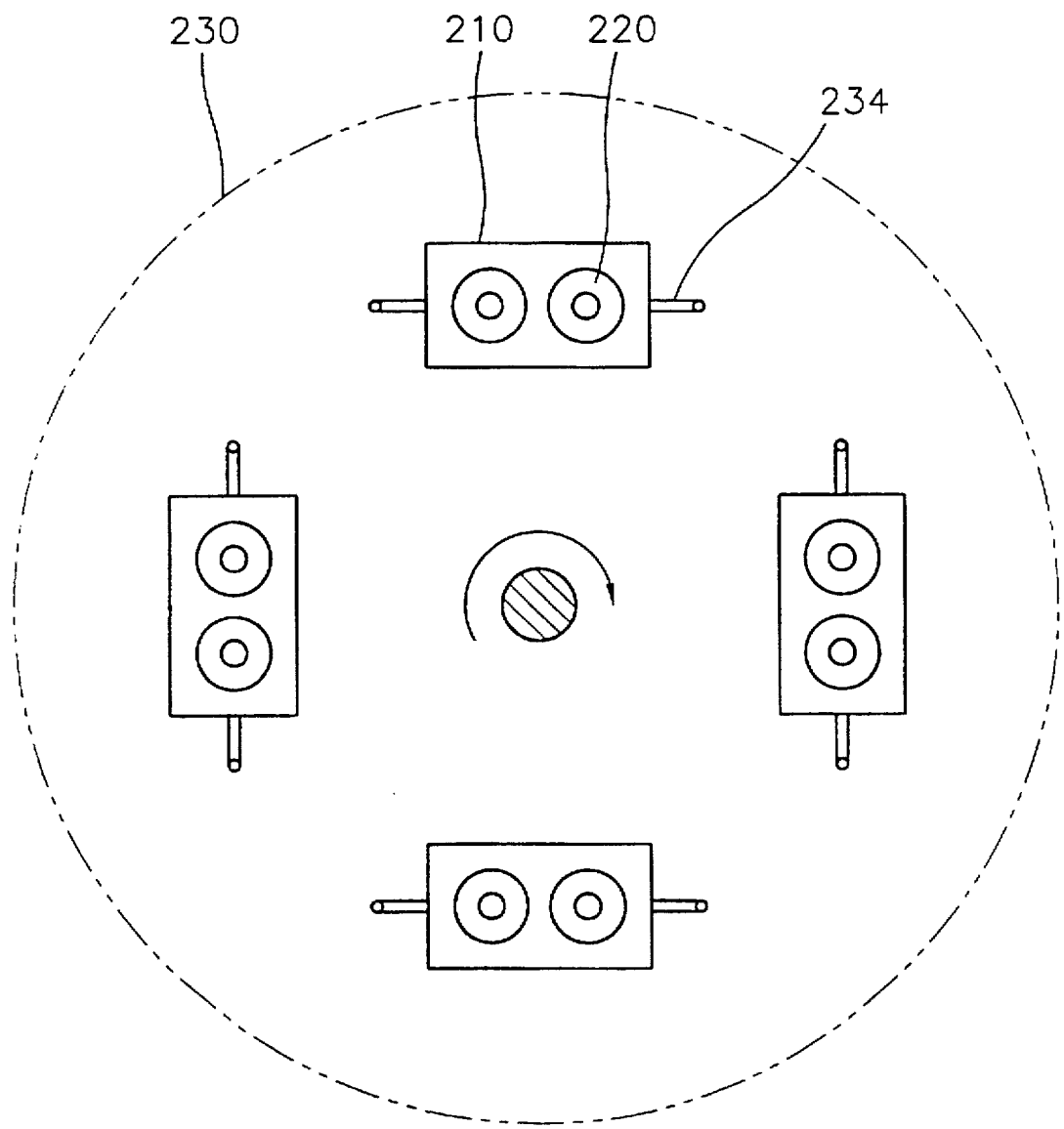
FIG. 4 is a plan view for showing a conventional apparatus for filling a battery case with electrolyte.
Figure 5:
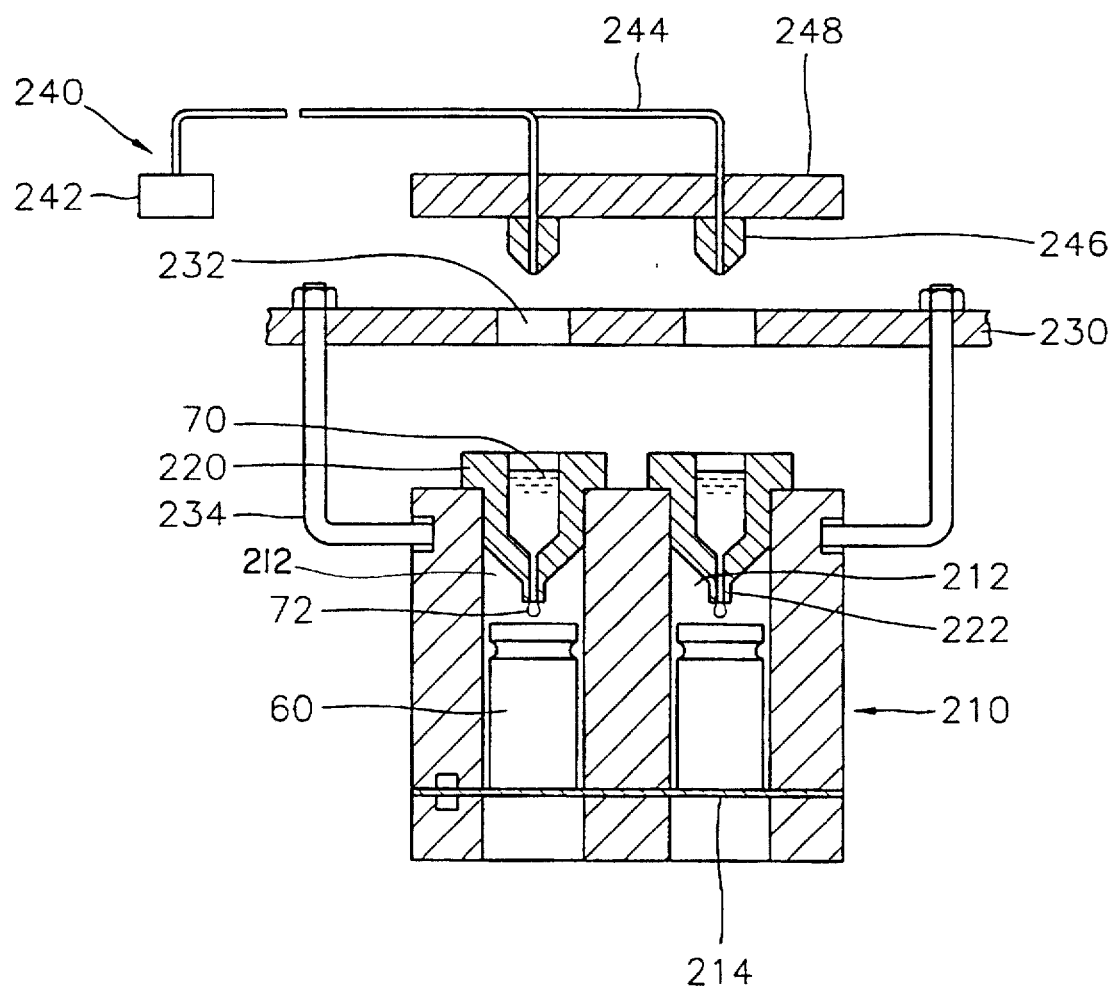
FIG. 5 is a cross sectional view for showing the conventional apparatus shown in FIG. 4.
Figure 6:
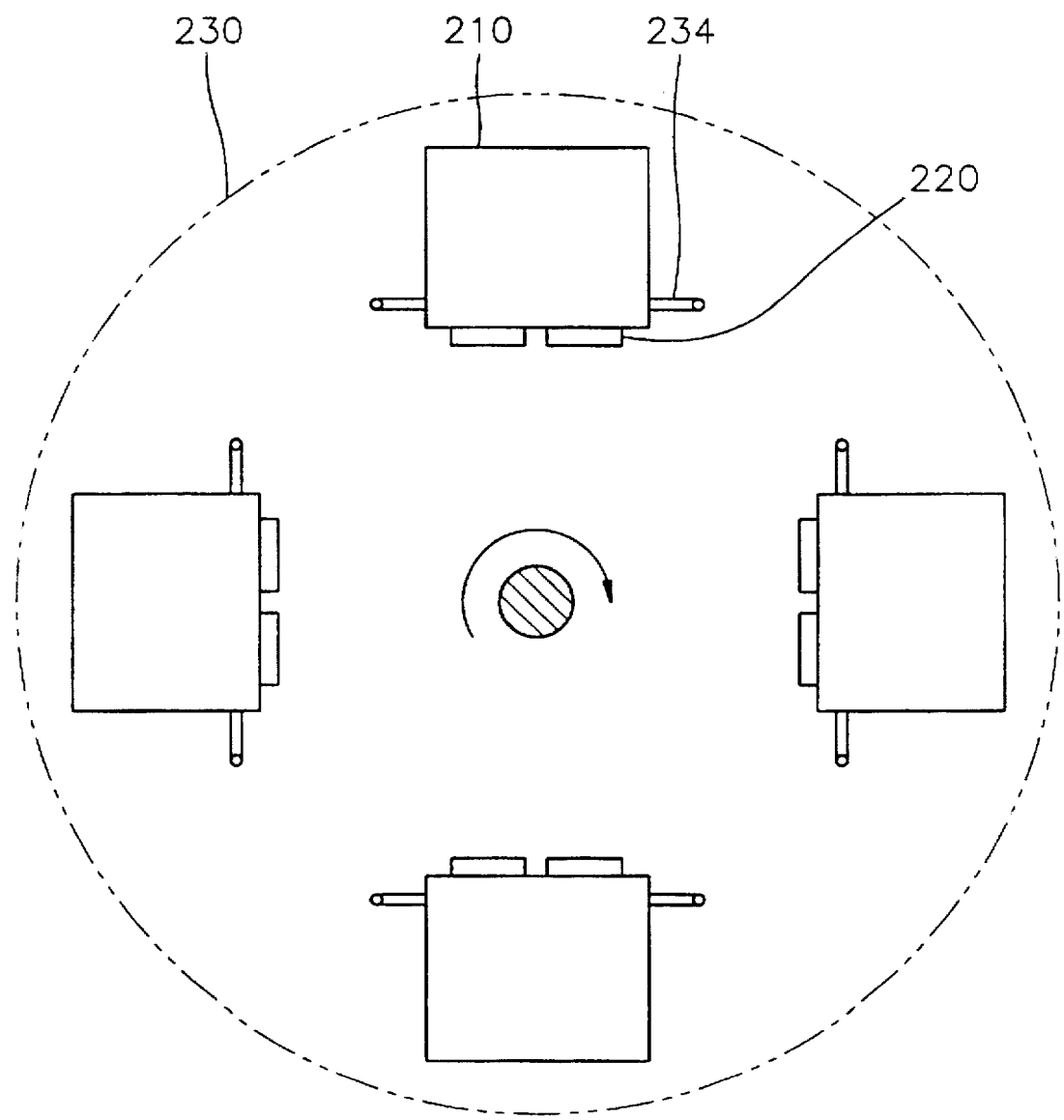
FIG. 6 illustrates the operating state of the conventional apparatus shown in FIGS. 4 and 5.

Hereinafter, a preferred embodiment of the present invention will be described in detail with reference to accompanying drawings in which the same reference numerals represent the same elements.

Figure 7:
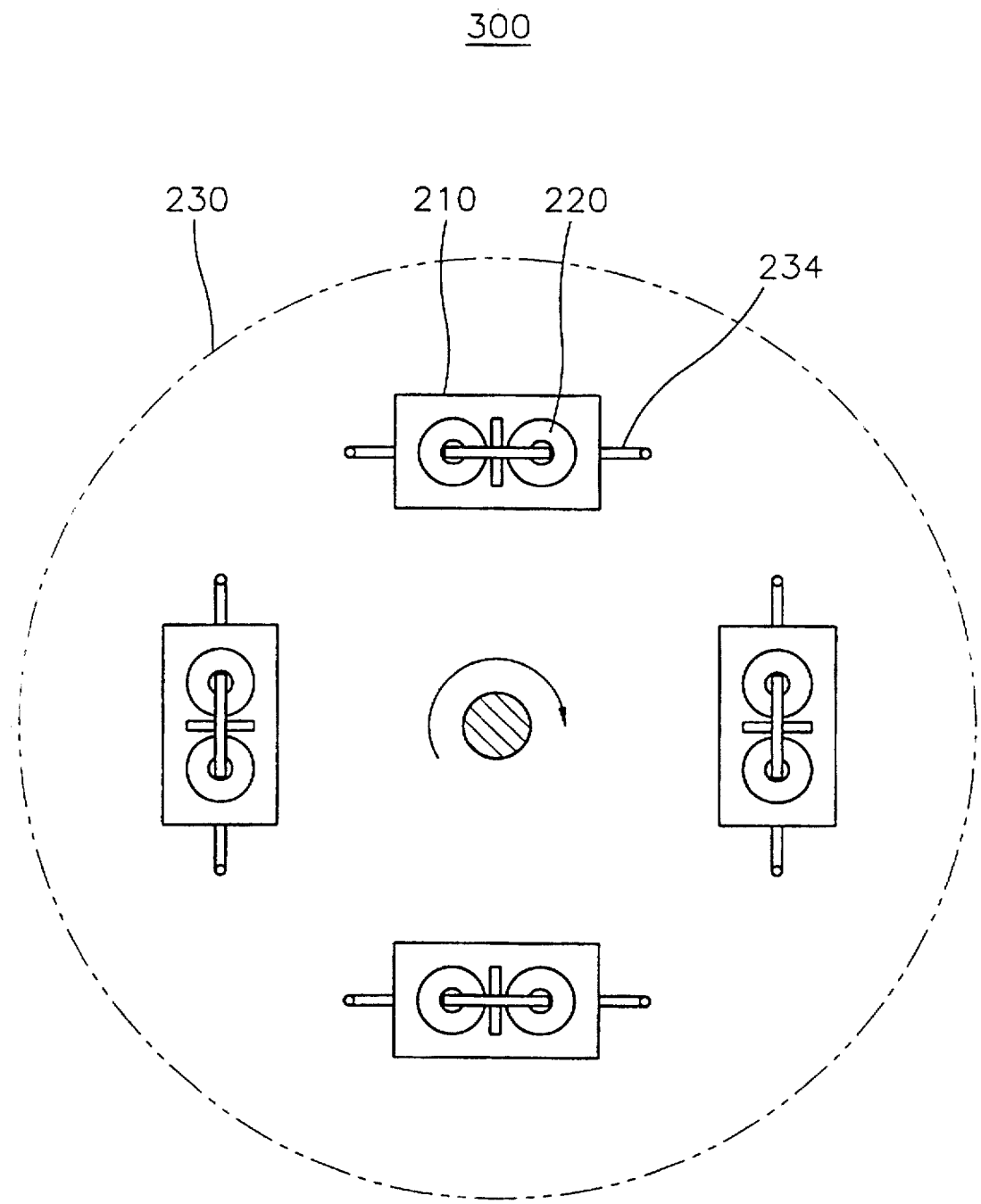
FIG. 7 is a plan view for showing an apparatus for filling a battery case with electrolyte according to a preferred embodiment of the present invention.
Figure 8:
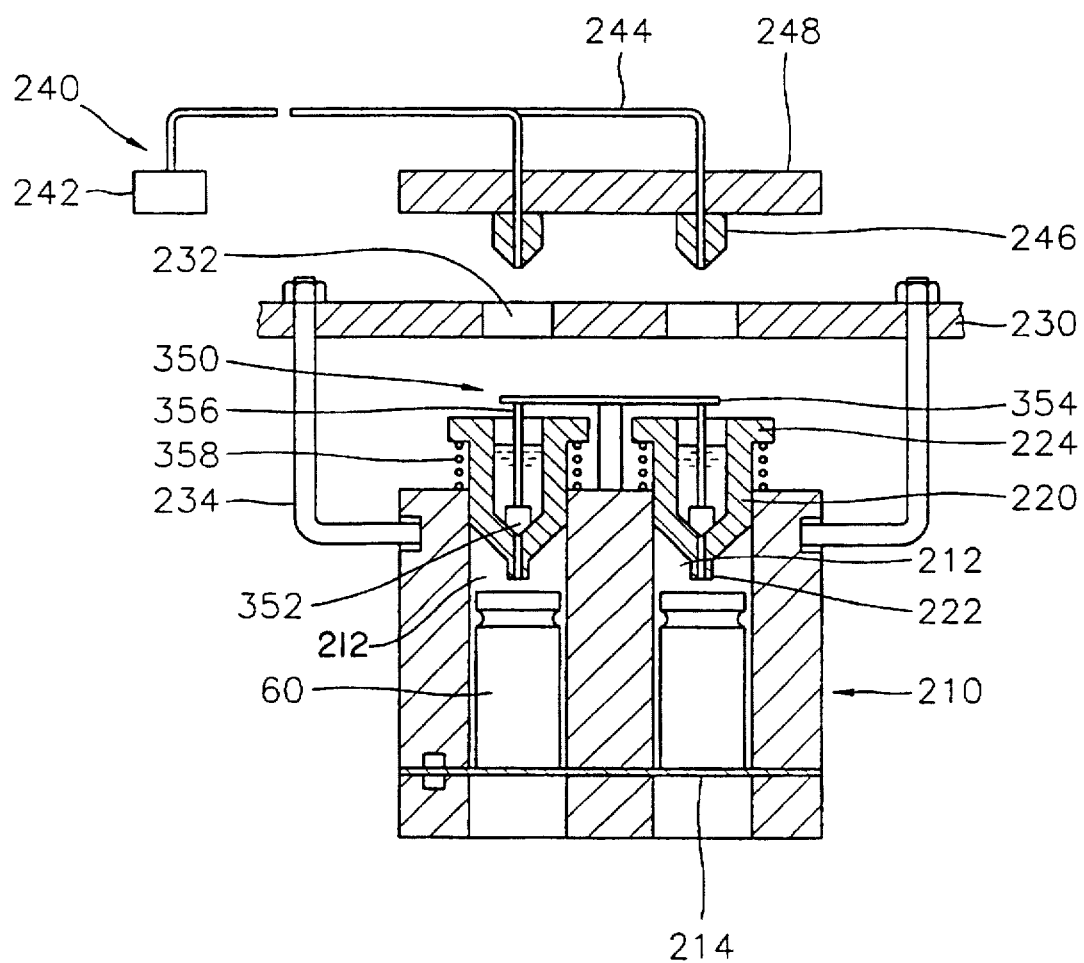
FIG. 8 is a cross sectional view for showing the apparatus shown in FIG. 7.
Figure 9:
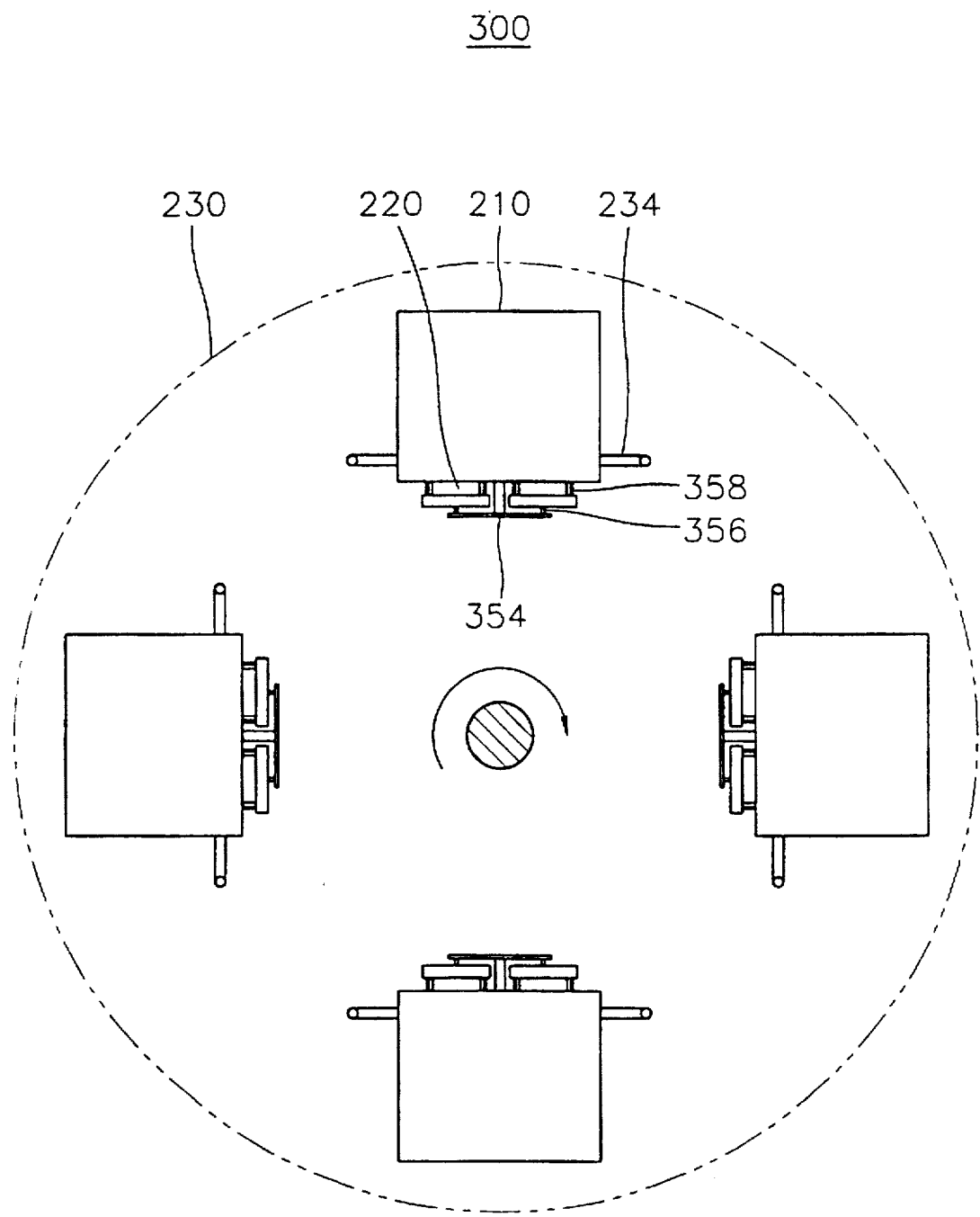
FIG. 9 is a schematic view for illustrating the operating state of the apparatus shown in FIGS. 7 and 8.

FIG. 7 is a plan view for showing an apparatus 300 for filling a battery case 60 with electrolyte 70 according to the preferred embodiment of the present invention, and FIG. 8 is a cross sectional view for showing the apparatus as shown in FIG. 7. As shown in the figures, apparatus 300 includes an electrolyte feeding unit 240 for feeding a predetermined amount of electrolyte 70, which has a pair of feeding nozzles 246 for feeding electrolyte 70, and which has a case receiving unit 210 for receiving and supporting case 60 having a winding assembly 50 therein. Case receiving unit 210 has a pair of longitudinal holes 212 formed therein, each adapted to receive one of the cases 60, and has a supporting plate 214, which is pivotally installed at the lower portion of case receiving unit 210, for supporting case 60.

A body 230 is located below feeding nozzles 246, rotates case receiving unit 210, and has multiple pairs of feeding openings 232 formed at a predetermined distance apart from each other at the outer circumference thereof. Case receiving unit 210 is pivotally installed at the lower portion of body 230 by a pair of connecting members 234.

An electrolyte filling port 220 fills case 60 with electrolyte 70 and stores electrolyte 70 fed from feeding nozzles 246. Filling port 220 is installed so that it can slide along each of longitudinal holes 212 of case receiving unit 210, and includes a filling nozzle 222 formed at the lower portion thereof and a shoulder 224 formed at an upper end thereof. Filling port 220 is lowered in the longitudinal direction of case receiving unit 210 when body 230 rotates at a speed not less than a predetermined speed, and is raised in the longitudinal direction of case receiving unit 210 when body 230 rotates at a speed slower than the predetermined speed. Electrolyte 70, which has been fed from feeding nozzles 246, is temporally stored in filling port 220.

Filling nozzle 222 is opened and closed by a valve unit 350. Valve unit 350 opens filling nozzle 222 when body 230 rotates at or above a predetermined speed, and closes filling nozzle 222 when body 230 rotates at a speed slower than the predetermined speed.

Electrolyte feeding unit 240 includes a pump 242 for feeding electrolyte 70, a pair of feeding nozzles 246 for feeding electrolyte into filling port 220, and a nozzle support plate 248 for supporting feeding nozzles 246. Electrolyte 70 flows along a passway 244 by pump 242, and is fed into filling port 220 via feeding nozzles 246, which is supported by nozzle support plate 248.

Case receiving unit 210 includes a pair of longitudinal holes 212 formed therein, and a supporting plate 214 installed at the lower portion of longitudinal holes 212 for supporting case 60, which is inserted into each of longitudinal holes 212 through the lower end of longitudinal holes 212. Each of longitudinal holes 212 is divided into two parts by supporting plate 214. Case receiving unit 210 is pivotally hinged at the lower portion of body 230 by connecting members 234, which are connected to the upper portion of case receiving unit 210. Longitudinal holes 212 are opened when supporting plate 214 pivots. Then, case 60, having winding assembly 50 therein, is inserted into each of longitudinal holes 212. At this time, supporting plate 214 pivotally returns to its original position, so longitudinal holes 212 are closed, and case 60 is supported by supporting plate 214.

If body 230 rotates, case receiving unit 210 pivots, with connecting members 234 as a pivoting center. That is, the upper portion of case receiving unit 210 is lowered with respect to connecting members 234, and the lower portion thereof is raised toward body 230. When body 230 rotates at a speed not less than a predetermined speed, case receiving unit 210, which rotates with body 230, becomes parallel with body 230. When filling of electrolyte 70 into case 60 is finished, supporting plate 214 pivots. Thus, longitudinal holes 212 are opened and case 60 falls down under each of longitudinal holes 212 so that it is unloaded from case receiving unit 210.

Filling port 220 moves into the inside of longitudinal holes 212 by the rotation (centrifugal force) of body 230, and electrolyte 70, which is temporally stored in filling port 220, flows into case 60 via filling nozzle 222.

Valve unit 350 includes a pair of filling valves 352 located at the upper edge of each filling nozzle 222 for opening and closing filling nozzle 222, a valve supporting plate 354, which is fixed to the upper end of case receiving unit 210 between filling ports 220, a pair of connecting rods 356 for hanging valves 352 to valve supporting plate 354, and a pair of bias members 358 installed between shoulder 224 of filling port 220 and the upper end of case receiving unit 210 for exerting a biasing force to filling port 220 so as to prevent filling nozzle 222 from being opened when the rotation speed of body 230 is slower than the predetermined speed. The bias member 358 may be a spring or may be comprised of rubber. When body 230 halts or rotates at a speed slower than the predetermined speed, filling port 220 cannot move downward into longitudinal holes 212, i.e., in the longitudinal direction of case receiving unit 210, due to the biasing force of the bias member. But, when the rotation speed of body 230 reaches the predetermined speed, filling port 220 overcomes the biasing force of bias member 358 and moves downward into longitudinal holes 212. At this time, filling nozzle 222, which was closed by valves 352, is opened. When the rotation speed of body 230 becomes slower than the predetermined speed, filling port 220 is raised along the longitudinal direction of case receiving unit 210 and filling nozzle 222 is closed by valves 352.

Hereinafter, the operation of apparatus 300 according to the preferred embodiment of the present invention will be described in detail.

When case 60 having winding assembly 50 therein is moved to a position under case receiving unit 210, longitudinal holes 212 are opened by the pivoting of supporting plate 214. Case 60 is inserted into each of longitudinal holes 212, and then longitudinal holes 212 are closed by the pivotable returning of supporting plate 214 to its original position. Thus, case 60 is supported by supporting plate 214.

Electrolyte 70 is fed into filling port 220 via passway 244 and feeding nozzles 246 by the operation of pump 242. At this time, electrolyte 70 is temporally stored in filling port 220 and is unable to flow outside therefrom because longitudinal holes 212 have been closed by valves 352.

After case 60 is inserted into case receiving unit 210 and electrolyte 70 is fed into each of filling port 220, body 230 rotates at a certain angle so that another case receiving unit 210 is under feeding nozzles 246 of electrolyte feeding unit 240. Then the insertion of case 60 and the feeding electrolyte 70 into filling port 220 are repeated.

When case 60 is inserted into each of case receiving unit 210, which is hanging on body 230, and electrolyte 70 is fed into each filling port 220, body 230 starts to rotate.

Figure 10:
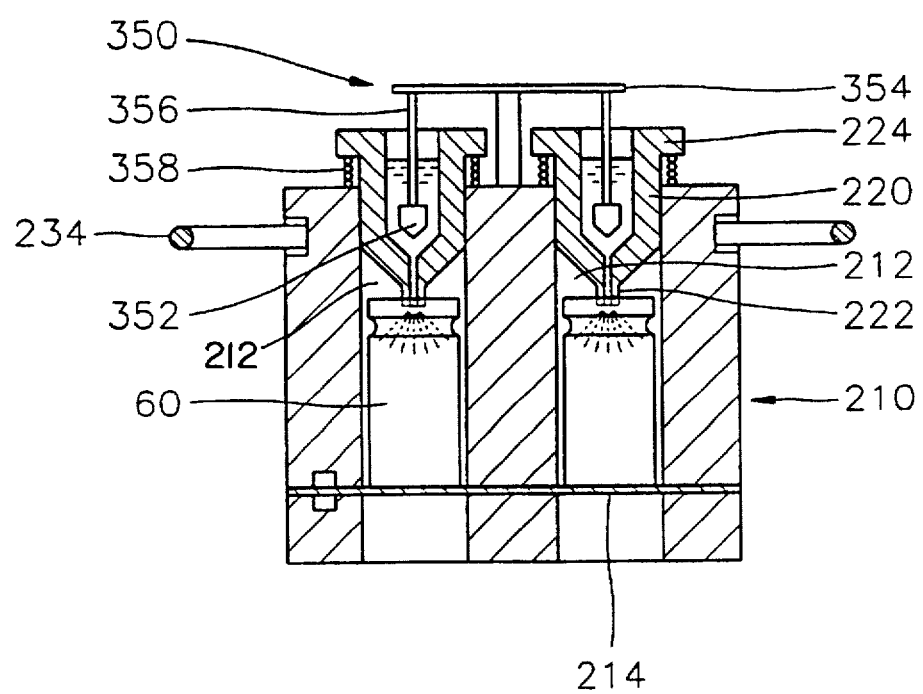
FIG. 10 is a schematic view for illustrating the operation of the filling port in the operating state of the apparatus shown in FIG. 9.

When the rotation speed of body 230 gradually increases and reaches the predetermined speed, case receiving unit 210 is pivoted to become parallel with body 230 and to rotate together with body 230. As shown in FIG. 10, filling port 220 overcomes the biasing force of bias member 358 and so it is lowered into longitudinal holes 212, and filling nozzle 222 is open.

At that time, electrolyte 70, which has been temporally stored in filling port 220, flows into case 60 via filling nozzle 222. Electrolyte 70, which has flowed into case 60, vents the air in the small gaps of winding assembly 50 outside case 60, and permeates in the small gaps of winding assembly 50.

After electrolyte 70 within filling port 220 flows into case 60, the rotation speed of body 230 decreases to a speed less than the predetermined speed, and filling port 220 is raised upwards in the longitudinal direction of case receiving unit 210. Thus, filling nozzle 222 is closed by valves 352.

If the rotation of body 230 ends, case receiving unit 210 becomes vertical with respect to body 230. Then, longitudinal holes 212 are opened by pivoting supporting plate 214 and case 60 falls and is released from case receiving unit 210.

According to the present invention, the electrolyte in filling port cannot leak through the filling nozzle unless the rotation speed of the body reaches the predetermined speed. Thus, all the battery cases can be simultaneously uniformly filled with the predetermined mount of the electrolyte so as to manufacture batteries having uniform properties. Also, the corrosion of the case, which may be caused by the filling of the battery cases with electrolyte, may be prevented.

While the present invention has been particularly shown and described with reference to particular embodiment thereof, it will be understood by those skilled in the art that various changes in form and detail may be effected therein without departing from the spirit and scope of the invention as defined by the appended claims.

What is claimed is:

1. An apparatus for filling a battery with an electrolyte, said apparatus comprising:

an electrolyte feeding unit for feeding a predetermined amount of the electrolyte, said electrolyte feeding unit including a pair of feeding nozzles for feeding the electrolyte;

a case receiving unit for receiving and supporting a case having a winding assembly therein, said case receiving unit including a pair of longitudinal holes, each adapted to receive said case, and a supporting plate, which is pivotally installed at a lower portion thereof for supporting said case;

a body, located below said feeding nozzle, for rotating said case receiving unit, a number of pairs of feeding openings being formed at a predetermined distance apart from each other on an outer circumference thereof, and said case receiving unit being pivotally installed at a lower portion of said body;

an electrolyte filling port, which is slidably installed within each of the longitudinal holes of said case receiving unit, for restoring the electrolyte fed from said feeding nozzle, said electrolyte filling port being lowered down in a longitudinal direction of said case receiving unit when said body rotates at a speed not less than a predetermined speed, and being raised in the longitudinal direction of said case receiving unit when said body rotates at a speed less than the predetermined speed, said filling port having a filling nozzle formed at a lower portion of said electrolyte filling port, and a shoulder formed at an upper end of said electrolyte port; and a valve unit for opening said filling nozzle when said body rotates at a speed not less than the predetermined speed, and for closing said filling nozzle when said body rotates at a speed less than the predetermined speed.

2. An apparatus as claimed in claim 1, wherein said electrolyte feeding unit further comprises:

a pump for feeding the electrolyte;

a nozzle support for supporting said feeding nozzles, wherein said feeding nozzles feed the electrolyte fed from said pump into said filling port.

3. An apparatus as claimed in claim 1, wherein said valve unit comprises:

a bias member, installed between the shoulder of said filling port and the upper end of said case receiving unit, for exerting a biasing force to said filling port so as to prevent said filling nozzle from being opened when the rotation speed of said body is less than the predetermined speed;

a filling valve, located on the upper edge of said filling nozzle, for opening and closing said filling nozzle;

a valve supporting plate fixed on the upper end of said case receiving unit between said filling ports; and a connecting rod for hanging said valve onto said valve supporting plate.

4. An apparatus as claimed in claim 3, wherein said bias member is comprised of a spring.

5. An apparatus as claimed in claim 3, wherein said bias member is comprised of rubber.

6. An apparatus for filling a battery with an electrolyte, said apparatus comprising:

an electrolyte feeding unit having a pump for feeding an electrolyte, a feeding nozzle for feeding the electrolyte fed from said pump, and a nozzle support plate for supporting said feeding nozzle;

a case receiving unit for receiving and supporting a case having a winding assembly therein, said case receiving unit including a longitudinal hole, adapted to receive said case, and a supporting plate which is pivotally installed at a lower portion thereof for supporting said case;

a body, located below said feeding nozzle, for rotating said case receiving unit, a number of pairs of feeding openings being formed at a predetermined distance apart from each other on an outer circumference thereof, and said case receiving unit being pivotally installed at a lower portion of said body;

an electrolyte filling port, which is slidably installed within the longitudinal hole of said case receiving unit, for restoring the electrolyte fed from said feeding nozzle, said electrolyte filling port being lowered down in a longitudinal direction of said case receiving unit when said body rotates at a speed not less than a predetermined speed, and being raised in the longitudinal direction of said case receiving unit when said body rotates at a speed less than the predetermined speed, said filling port having a filling nozzle formed at a lower portion of said electrolyte filling port, and a shoulder formed at an upper end of said electrolyte port; and a valve unit for opening said filling nozzle when said body rotates at a speed not less than the predetermined speed, and for closing said filling nozzle when said body rotates at a speed less than the predetermined speed, said valve unit including a bias member, installed between the shoulder of said filling port and the upper end of said case receiving unit, for exerting a biasing force to said filling port so as to prevent said filling nozzle from being opened when the rotation speed of said body is less than the predetermined speed; a filling valve, located on the upper edge of said filling nozzle, for opening and closing said filling nozzle; a valve supporting plate fixed on the upper end of said case receiving unit between said filling ports; and a connecting rod for hanging said valve onto said valve supporting plate.

* * * * *